United States Patent [19]
Edelen et al.

[11] Patent Number: 5,370,449
[45] Date of Patent: Dec. 6, 1994

[54] ELECTRICALLY OPERATED PARKING BRAKE SYSTEM

[75] Inventors: Stephen A. Edelen, Battle Creek; Robert W. Jones, Canton, both of Mich.

[73] Assignee: Eaton Corporation, Cleveland, Ohio

[21] Appl. No.: 135,901

[22] Filed: Oct. 12, 1993

[51] Int. Cl.$^5$ .............................................. B60T 13/22
[52] U.S. Cl. ....................................... 303/3; 188/170;
188/151 A; 303/15; 303/71; 303/9.76
[58] Field of Search ................. 303/71, 9.76, 3, 2, 303/15-18, 119.2, 14, 6.01, 7, 100, 9, 9.61, 91, 94, 95; 188/170, 151 A; 192/4 R, 4 A; 251/129.1, 129.09, 129.01; 137/596.17

[56] References Cited

U.S. PATENT DOCUMENTS

| | | | |
|---|---|---|---|
| 4,068,899 | 1/1978 | Nolte et al. | 303/15 |
| 4,307,916 | 12/1981 | Straut et al. | 303/71 |
| 4,339,154 | 7/1982 | Duttarer et al. | 303/71 |
| 4,346,943 | 8/1982 | Leiber | 303/119.2 |
| 4,349,233 | 9/1982 | Bullard et al. | 303/71 |
| 4,824,178 | 4/1989 | Petersen . | |
| 5,090,780 | 2/1992 | Powell | 303/15 |

OTHER PUBLICATIONS

Watch #105, Felsted Park Brake Shifter, Aug. 29, 1991.

Primary Examiner—Douglas C. Butler
Attorney, Agent, or Firm—Brooks & Kushman

[57] ABSTRACT

A parking brake system is provided which includes a dual solenoid operated valve located in series with the emergency brake control valve of a hydraulically operated brake system. The dual solenoid valve is operable to either one of two mechanical detent positions so that positioning of the valve is retained in the event of loss of power. The dual solenoid valve is controlled by the vehicle operator from the transmission console and removes fluid pressure from the brakes when actuated to a PARK position. An electronic control unit is provided for sensing the speed of the vehicle and the pressure in the hydraulic line to the brakes and provides a PARK enabling signal when the vehicle speed is below a predetermined amount. When a gear is selected at the console the dual solenoid valve is actuated to a position permitting fluid pressure to be applied to the brakes and effectively returns control of the brakes to the emergency brake control device. A pressure sensor is provided in the line to the brakes and is used to provide feedback to the driver and to control transmission shifting.

7 Claims, 1 Drawing Sheet

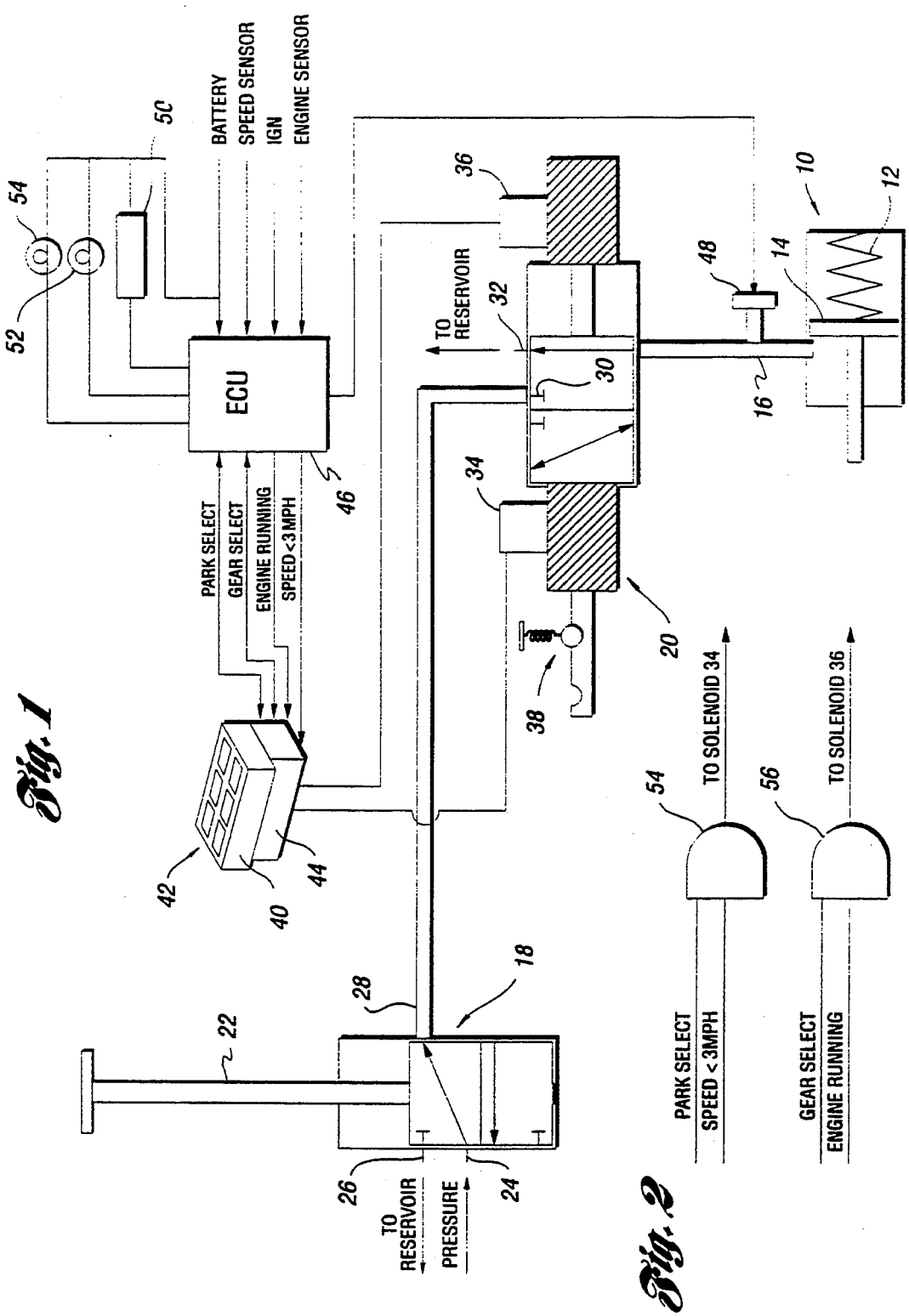

ELECTRICALLY OPERATED PARKING BRAKE SYSTEM

TECHNICAL FIELD

This invention relates to electrically controlled parking brake systems and more particularly to such a system including a fault tolerant feature which permits the system to maintain its present condition in the event of a loss of electrical power.

BACKGROUND ART

Braking systems have been proposed wherein the brakes can be electrically controlled from a solenoid operated valve connected in series with the usual "emergency" brake control which mechanically actuates a valve by pushing or pulling a plunger located on the vehicle dashboard. The electrically operated valve may be operated from the transmission control console, so that a "park" position may be selected which results in the transmission being shifted to neutral and the emergency brakes being applied. The electrically operated valve is usually spring biased to a position applying the brakes when the solenoid is deenergized. In order to release the brakes the solenoid must be energized from the vehicle battery. One of the problems with such systems is that an unexpected loss of electrical power results in de-energization of the electrically operated valve and application of the brakes which may create a hazardous condition.

SUMMARY OF THE INVENTION

In accordance with the present invention a parking brake system is provided which includes a dual solenoid operated valve located in series with the emergency brake control in an otherwise conventional hydraulic or pneumatic brake system. The dual opposed solenoid valve is operable to either one of two mechanical detent positions so that positioning of the valve is retained in the event of loss of power. The dual solenoid valve is controlled by the vehicle operator from the transmission console and removes fluid pressure from the brakes when actuated to a PARK position. An electronic control unit (ECU) is provided for sensing the speed of the vehicle and the pressure in the hydraulic line to the brakes and provides a PARK enabling signal when the vehicle speed is below a predetermined value. Selection of the PARK position at the console is effective only in the presence of an PARK enabling signal from the ECU. When a gear is selected at the console the dual solenoid valve is actuated to a position permitting fluid pressure to be applied to the brakes and effectively returns control of the brakes to the emergency brake control device. A pressure sensor is provided in the line to the brakes and provide an input to the ECU indicative of whether the brakes are being applied (low pressure) or are released (high pressure). This pressure input is used to provide feedback to the driver and to control transmission shifting.

BRIEF DESCRIPTION OF THE DRAWINGS

A more complete understanding of the present invention may be had from the following detailed description which should be read in conjunction with the drawings in which:

FIG. 1 is a schematic block diagram of the system of the invention;

FIG. 2 is a logic diagram of the control of the dual solenoid valve employed in the system of the invention;

DETAILED DESCRIPTION OF THE PREFERRED EMBODIMENT

Referring now to the drawing and initially to FIG. 1, the motor vehicle emergency/parking brake system of the present invention includes a pair of brake canisters, one of which is shown and generally designated 10. The canister 10 includes a spring 12 for actuating the brakes through an actuator 14. When fluid pressure is applied to the canister 10 through a pressure line 16, the emergency/parking brakes are released. When fluid pressure is removed from the canister 10, the brakes are applied through the action of the spring 12. Pressurized fluid is supplied from a conventional hydraulic fluid source, not shown, through a pair of serially coupled valves generally designated 18 and 20. The valve 18 provides the conventional "emergency" brake control by being mechanically actuated between valve open and valve closed positions by a valve actuator 22. The valve 18 is shown schematically to include an inlet port 24, for receiving pressurized fluid from the source, and a vent port 26 for venting the fluid to a reservoir, not shown. The valve 18 is shown in the "off" or open position wherein fluid is supplied under pressure to the valve output line 28. If the valve 18 is moved upwardly to an "on" or closed position, the inlet port 24 is closed and fluid in the line 28 is vented to the reservoir through the port 26.

The line 28 connects the output of the valve 18 with an input of the valve 20 through an inlet port 30. The valve 20 includes a vent port 32 connected with the reservoir. The output of the valve 20 is connected with the line 16. The valve 20 is electrically operated by a pair of solenoids 34 and 36. The solenoid 34 is momentarily energized to position the valve 20 in the position shown, and is maintained in such position by a mechanical detent generally depicted at 38. In this position the line 16 is vented to the reservoir and consequently the brakes are applied by the spring 12. This position is hereinafter referred to as the PARK SELECT position of the valve 20. The valve 20 may be actuated by momentarily energizing the solenoid 36, to overcome the detent 38 and move the valve structure to the right as viewed schematically in FIG. 1, to a position where fluid in the line 28 is passed to the line 16. The valve is also maintained in this position by the detent 38, after the solenoid is deenergized. This position of the valve 20 is hereinafter referred to as the GEAR SELECT position. In this position, control of the brakes is returned to the mechanical valve 18.

Control of the dual solenoid operated valve 20 is from the transmission shift console generally designated 40. The console 40 includes a plurality of momentary switch actuators generally designated 42, actuable by the vehicle operator to close respective switches and select a desired gear. Included in the plurality of switches is a Park switch which requests a shift to Neutral gear and application of the parking brakes. The console includes discrete control logic generally designated 44 which is responsive to actuation of the switches as well as inputs from an electronic control unit (ECU) generally designated 46. The logic 44 provides outputs to the solenoids 34 and 36 for momentarily energizing the solenoids to cause a change in position of the valve 20. As indicated in FIG. 1, the ECU 46 receives inputs from the vehicle battery and ignition switch as well as from a vehicle speed sensor and an engine sensor indicating the engine is running. The ECU 46 provides an input to the control logic 44 indicative of the vehicle speed being less than a predetermined threshold speed of for example three (3) miles per hour, SPEED <3MPH, as well as an input designated ENGINE RUNNING, idicative of whether the engine is running. The ECU 46 monitors the pressure in the line 16 through a pressure sensor 48. The ECU 46 control a warning device 50 which may be an audible and/or visual means of indicating to the operator that some action he has taken is improper under the circumstances. The lamps 52 and 54 may be used to illuminate PARK and NEUTRAL indicia on the associated switch actuators of the console 40 and under certain circumstances may be flashed to direct the operator to press the associated switch actuators. While not shown the ECU 46 may also control lamps illuminating the indicia on the other switch actuators of the console 40. Control of the devices 50, 52 and 54 is based on the status of certain inputs to the ECU 46 as will be explained hereinafter.

As shown in FIG. 2, the logic for controlling the solenoid 34 includes an AND gate 54 responsive to the inputs PARK SELECT and SPEED <3MPH. When both of these events are true the solenoid 34 is energized. Since the PARK switch is only momentarily actuated to the closed position the solenoid 34 will be deenergized upon release of the PARK switch actuator. The logic for energizing the solenoid 36 includes an AND gate 56 responsive to the ENGINE RUNNING and GEAR SELECT inputs. When both are true the solenoid 36 is momentarily energized.

The operation of the system is as follows: With the ignition ON, if PARK is selected at the console 40, and SPEED <3MPH is present, the valve 20 is positioned by the solenoid 34 to relieve pressure from the brake canisters, thus applying the parking brake. If GEAR SELECT and ENGINE RUNNING are present, the valve 20 will be positioned by the solenoid 36 to return control of the brakes to the mechanical valve 18. The transmission will be placed in the gear requested as soon as the pressure sensor 48 reports a high pressure indicating the brakes are released. If the vehicle is traveling at a speed in excess of 3 MPH when the PARK switch is actuated as respectively indicated by the speed sensor and PARK SELECT inputs to the ECU 46, then the warning device 50 is periodically energized and the existing gear is maintained. In an emergency situation, the operator can still apply the brakes by operating the valve 18 to relieve pressure in the line 28. If the operator selects a gear while the parking brakes are applied as indicated by the sensor 48, and the engine is not running, the parking brake will not be released and the transmission will remain in Neutral gear. If the operator turns the ignition OFF without selecting PARK, the ECU 46 will pulse the PARK lamp 52 for a predetermined time interval such as 10 seconds. The console lamp illuminating the indicia associated with the existing gear selection remains illuminated. If PARK has not been selected at the end of this time interval, the ECU 46 enters the normal power down sequence, but stores these conditions so that at power up, the ECU 46 will flash the PARK light 52 and pulse the warning device 50. If PARK is selected by the operator but the pressure in the line 16, as indicated by the pressure sensor 48, remains high after a suitable interval, the ECU 46 energizes the warning device 50 to warn the operator of a failure within the parking brake system and that the parking brake has not been applied. These functions may be implemented by discrete AND gate logic as depicted in FIG. 2 by controlling the appropriate indicator or warning device in response to the described conditions. Alternatively, the ECU 46 may be programmed to perform to specified control function in response to the indicated input conditions.

While the best mode for carrying out the invention has been described in detail, those familiar with the art to which this invention relates will recognize various alternative designs and embodiments for practicing the invention as defined by the following claims.

What is claimed is:

1. A brake control system for a motor vehicle parking brake means which is biased toward a brake apply position and maintained in a brake release position by the application of pressurized fluid to the brake means, said control system comprising:
   a source of fluid pressure,
   mechanically actuated valve means,
   electrically actuated valve means,
   said mechanically actuated valve means actuable to a position communicating fluid from said source to said electrically actuated valve means,
   said electrically actuated valve means including a valve structure actuable to a first position by energization of a first solenoid means and to a second position by energization of a second solenoid means, said structure including means for releasably maintaining said structure in said first and second positions upon de-energization of said first or second solenoid means respectively,
   said electrically actuated valve means adapted to relieve the fluid pressure from said parking brake means while in said first position, and to apply pressurized fluid from said source to said parking brake means while in said second position,
   transmission gear selection means for selecting at least one transmission gear and for selecting application of the parking brake means,
   control means for energizing said first solenoid means in response to a parking brake application selection, and for energizing said second solenoid means in response to a gear selection.

2. The system defined in claim 1 wherein said mechanically actuated valve means serves as an emergency brake control when actuable to a second position removing said source from said electrically actuated valve means.

3. The system defined in claim 2 further comprising a vehicle speed sensor and wherein said control means is responsive to said speed sensor for preventing energization of said first solenoid means unless the vehicle speed is below a predetermined value.

4. The system defined in claim 3 further comprising a vehicle engine condition sensor and wherein said control means is responsive to said engine condition sensor for preventing energization said second solenoid means unless the vehicle engine is running.

5. The system defined in claim 3 further comprising warning means, a pressure sensor for monitoring the fluid pressure applied to said parking brake means, said control means responsive to said pressure sensor for energizing said warning means in response to a gear selection unless a predetermined pressure is being applied to said brake means sufficient to release said brake means.

6. The system defined in claim 5 further comprising indicator means, said control means responsive to the status of the vehicle ignition switch for energizing said indicator means for a predetermined time interval if the ignition switch is turned off prior to selecting application of the parking brakes.

7. The system defined in claim 6 wherein said control means stores the conditions existing at power down and prevents engine starting unless or until a selection of application of the parking brakes is present.

* * * * *